United States Patent [19]

Saida et al.

[11] 4,061,116
[45] Dec. 6, 1977

[54] KNOCK LEVEL CONTROL APPARATUS FOR AN INTERNAL COMBUSTION ENGINE

[75] Inventors: Yoshinori Saida; Kazumasa Katoh, both of Yokohama, Japan

[73] Assignee: Nissan Motor Co., Ltd., Yokohama, Japan

[21] Appl. No.: 623,020

[22] Filed: Oct. 16, 1975

[30] Foreign Application Priority Data

| Oct. 17, 1974 | Japan | 49-119629 |
| May 20, 1975 | Japan | 50-59207 |
| May 20, 1975 | Japan | 50-59208 |
| June 4, 1975 | Japan | 50-74700[U] |

[51] Int. Cl.² .............................................. F02D 5/04
[52] U.S. Cl. .................................................. 123/117 D
[58] Field of Search ....... 123/32 EA, 117 R, 146.5 A, 123/148 E, 117 D, 32 EB, 119 ED

[56] References Cited

U.S. PATENT DOCUMENTS

| 2,220,558 | 11/1940 | Von Dijck et al. | 123/198 |
| 2,275,675 | 3/1942 | Draper et al. | 123/32 EA |
| 2,407,652 | 9/1946 | Costa | 123/119 |
| 2,450,882 | 10/1948 | Costa | 123/32 EA |
| 2,523,017 | 9/1950 | Harrison | 123/32 EA |
| 2,670,724 | 3/1954 | Reggio | 123/140 MC |
| 3,789,816 | 2/1974 | Taplin et al. | 123/139 AW |
| 3,800,599 | 4/1974 | Goran | 73/116 |
| 3,872,846 | 3/1975 | Taplin et al. | 123/119 A |
| 3,875,912 | 4/1975 | Bullo | 123/146.5 A |

*Primary Examiner*—Ronald H. Lazarus
*Assistant Examiner*—Tony M. Argenbright

[57] ABSTRACT

A knock level control apparatus for an internal combustion engine, which comprises knock voltage generating means for generating a knock voltage representing a maximum level of frequency components of knock sounds emitted from the internal combustion engine, knock level discriminating means for producing a control signal by comparing the knock voltage with a function voltage, and ignition timing control means for controlling the ignition timing of the internal combustion engine in accordance with the control voltage.

11 Claims, 37 Drawing Figures

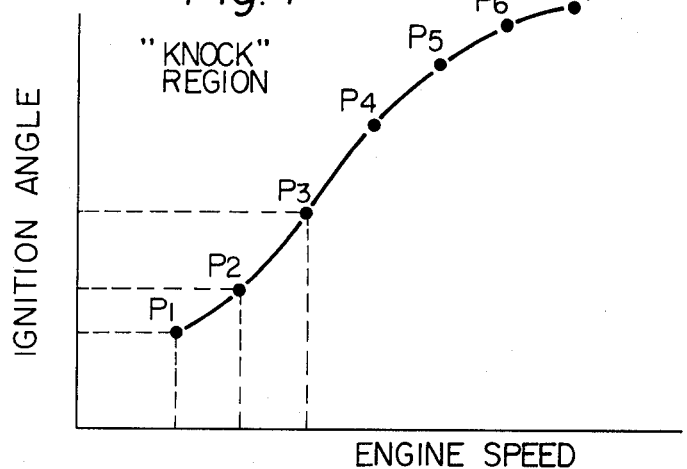
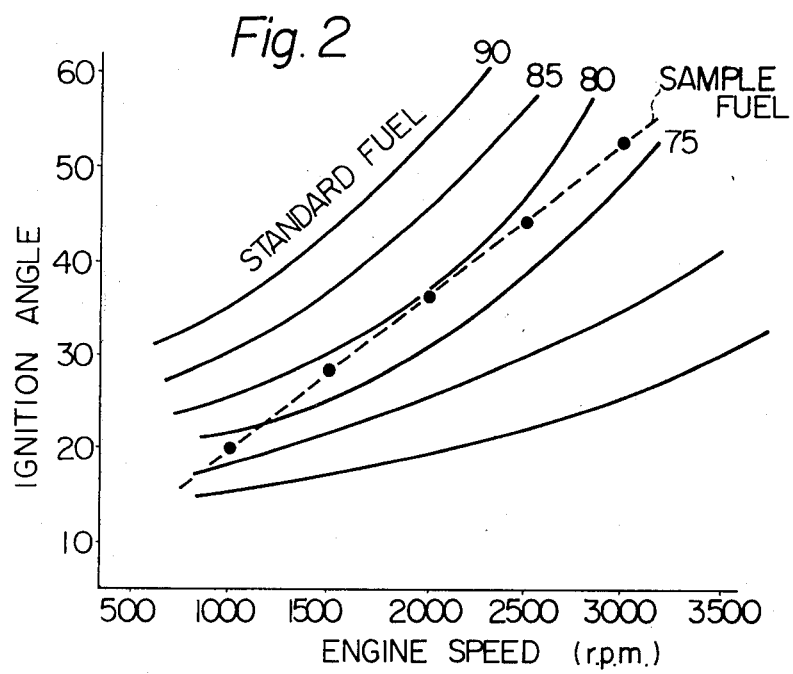

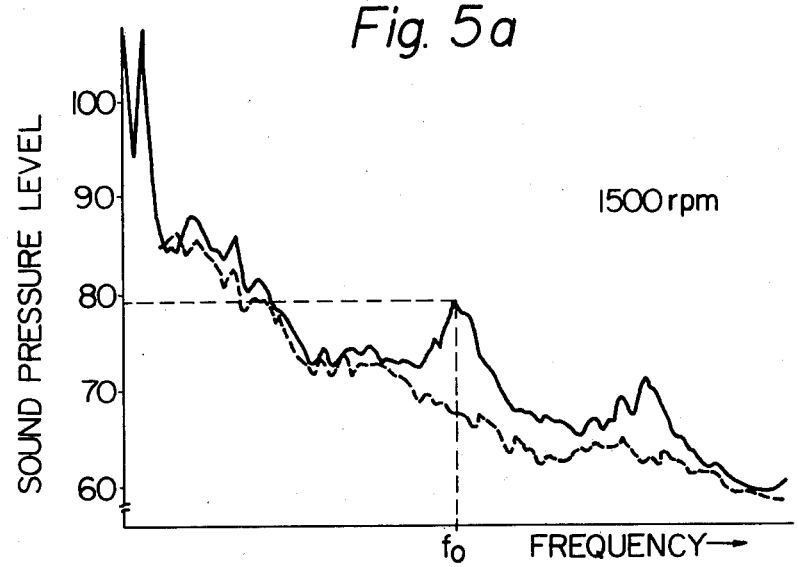
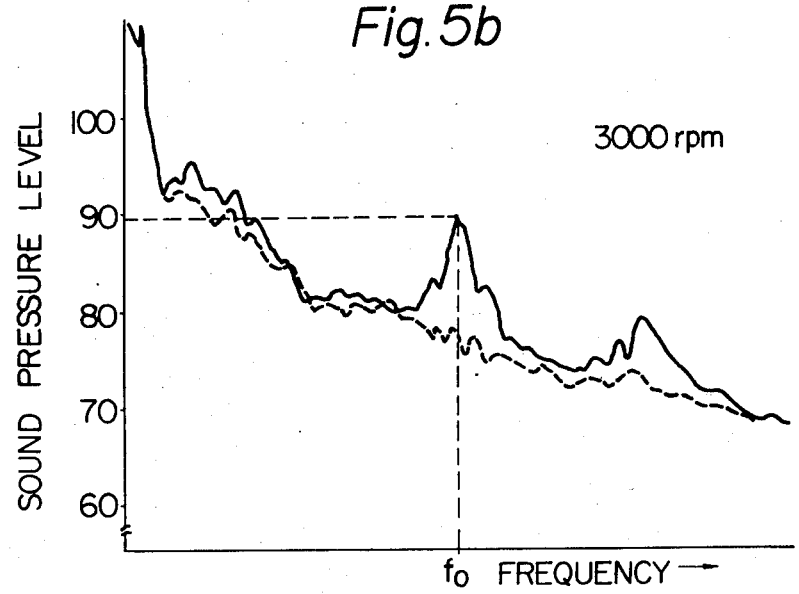

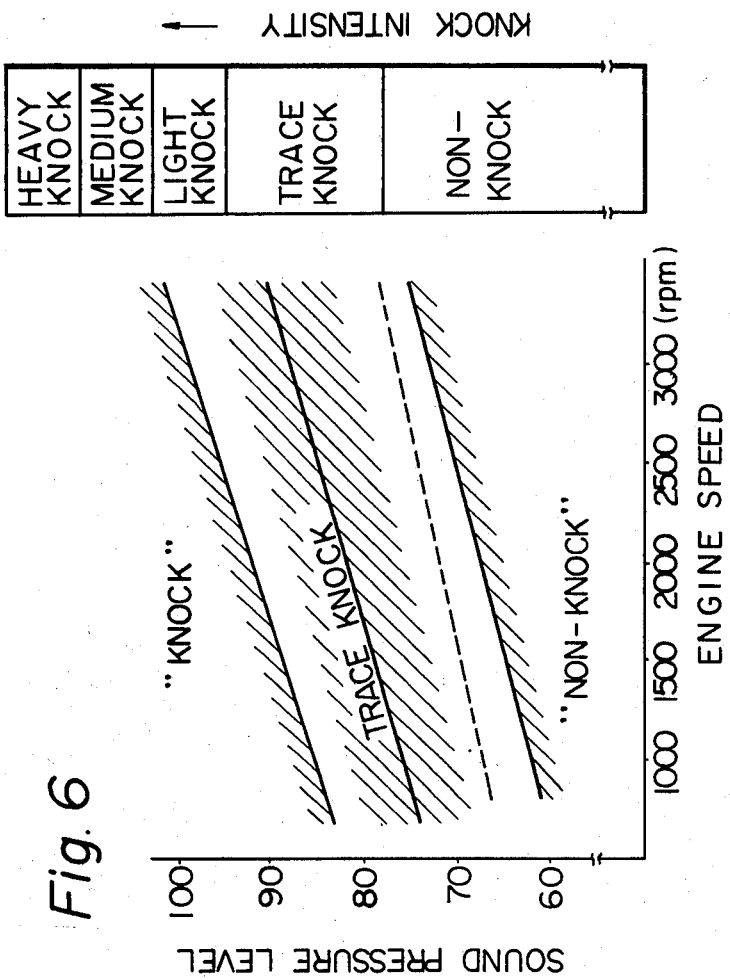

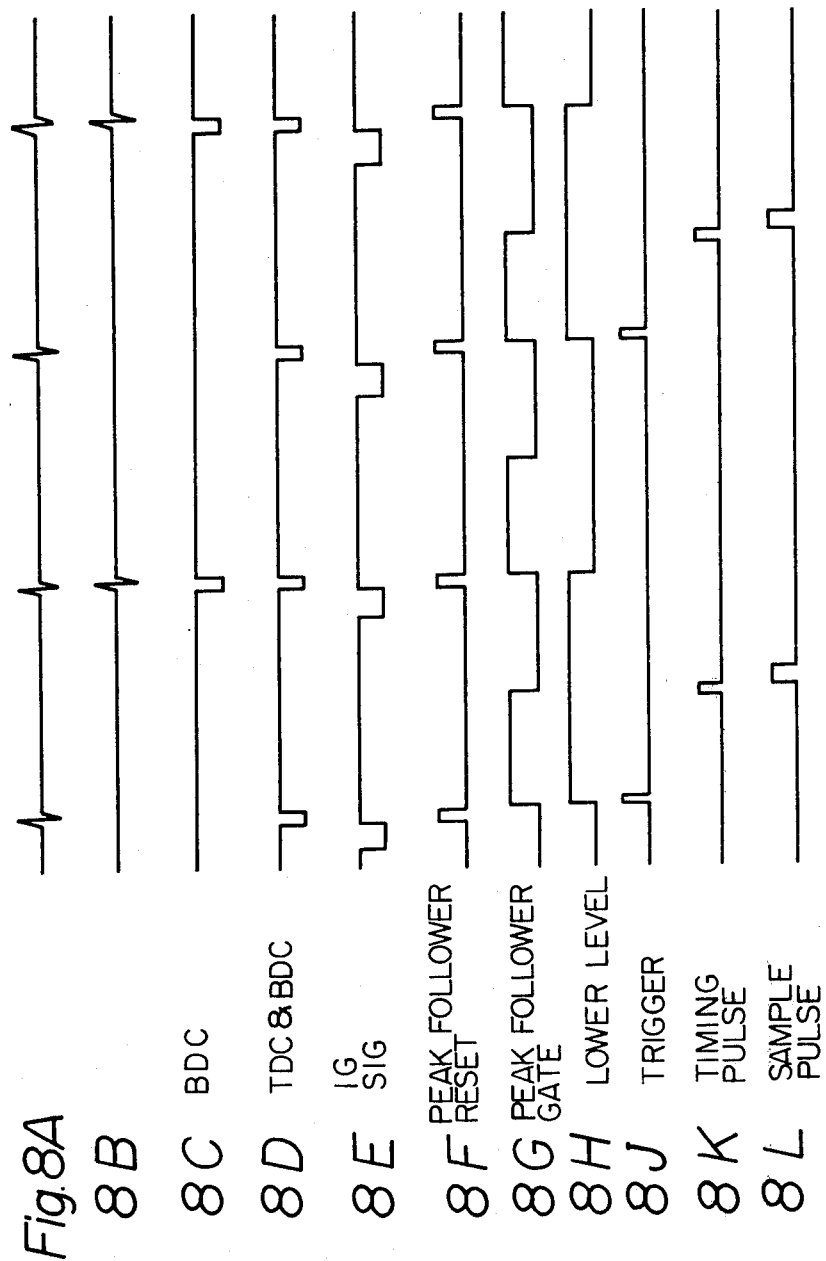

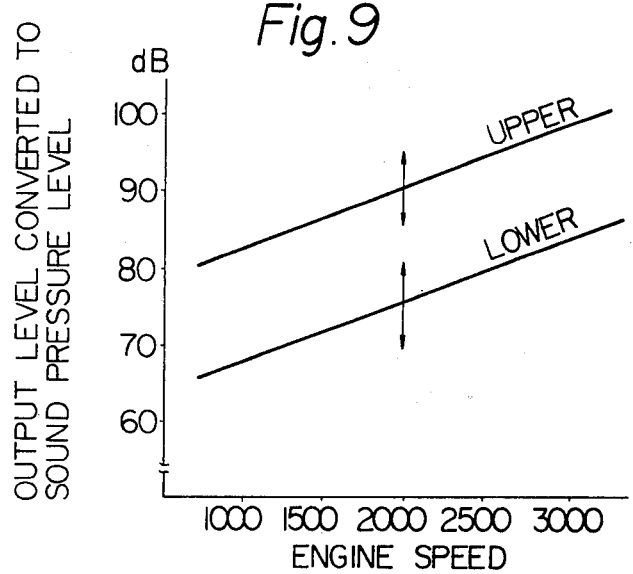
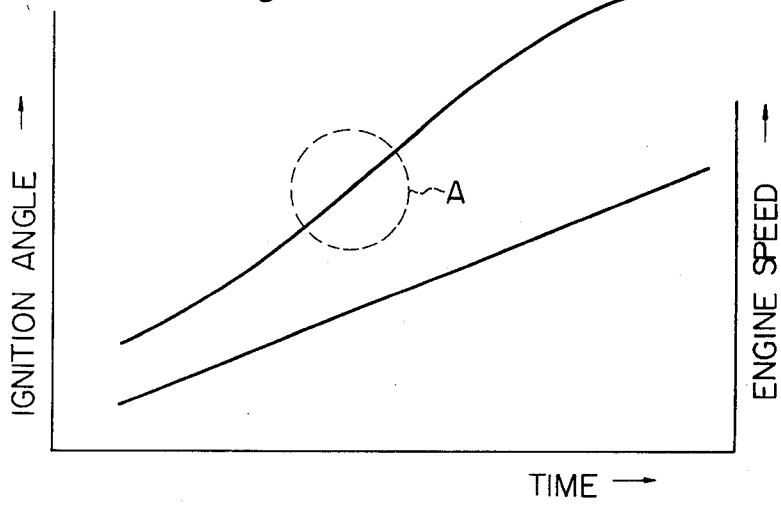

KNOCK LEVEL CONTROL APPARATUS FOR AN INTERNAL COMBUSTION ENGINE

The present invention relates to a knock level controlling apparatus for an internal combustion engine, and more particularly to a knock level controlling apparatus for regulating the ignition timing of the internal combustion engine in response to the engine speed so as to operate the engine under trace knock conditions at various engine speeds.

The Modified Borderline Method is a method to measure a road octane number of an automobile internal combustion engine. In this method, the engine is operated on the sample fuel at specified speeds, using specified ignition timing. The knock intensity is determined by ear so as to operate the engine under trace knock condition. However, it has been a problem that the method requires a great deal of skill to precisely measure the road octane number so that it is difficult to obtain the same results when the method is repeated by several times under the same conditions.

It is therefore a principal object of the invention to provide a knock level controlling apparatus for an internal combustion engine which is useful for desirably performing the Modified Borderline Method.

It is another object of the present invention to provide a knock level controlling apparatus for an automobile internal combustion engine for operating the engine under a trace knocking level throughout various engine speeds.

It is a further object of the present invention to provide a knock level controlling apparatus which can desirably cooperate with various types of automobile internal combustion engines.

It is a still further object of the present invention to provide a knock level controlling apparatus for an internal combustion engine which can precisely control the knock level even at low engine speeds and weak knock level.

It is a further object of the present invention to provide a knock level controlling apparatus for an automobile internal combustion engine which is almost constituted by digital elements and accordingly, simple in construction and economical.

The foregoing and other objects, features and following more particular description of several preferred advantages of the invention will be apparent from the embodiments of the invention, as illustrated in the accompanying drawings wherein:

FIG. 1 is a diagram showing a Borderline knock curve as to an automobile internal combustion engine;

FIG. 2 is a diagram showing Borderline knock curves of standard fuels and a sample fuel as to an automobile internal combustion engine;

Figure 7:
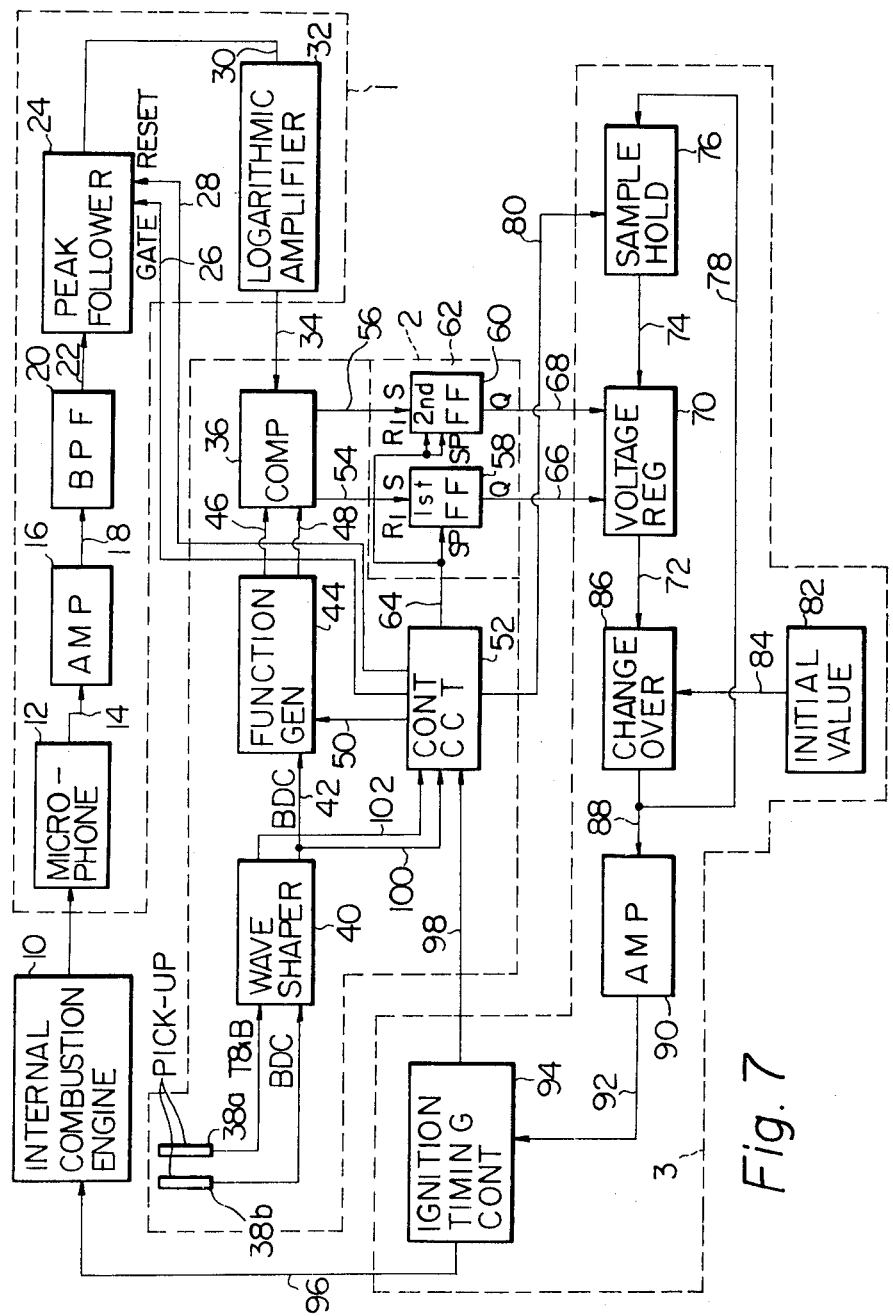
Figure 11:
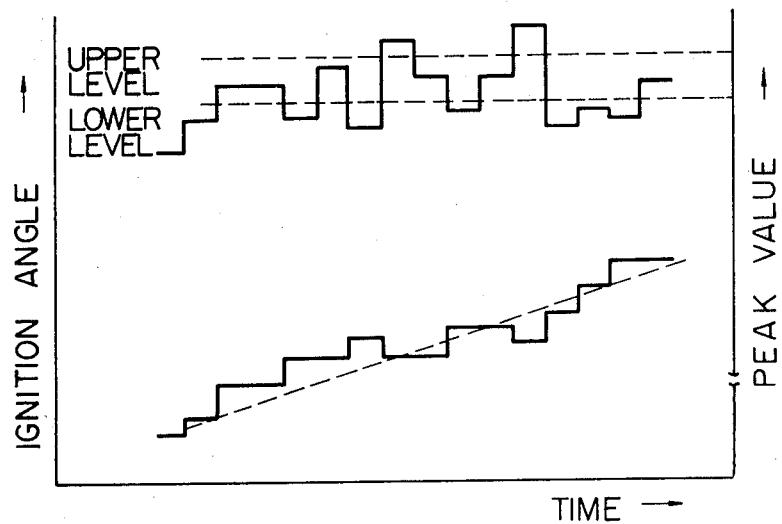
Figure 12A:
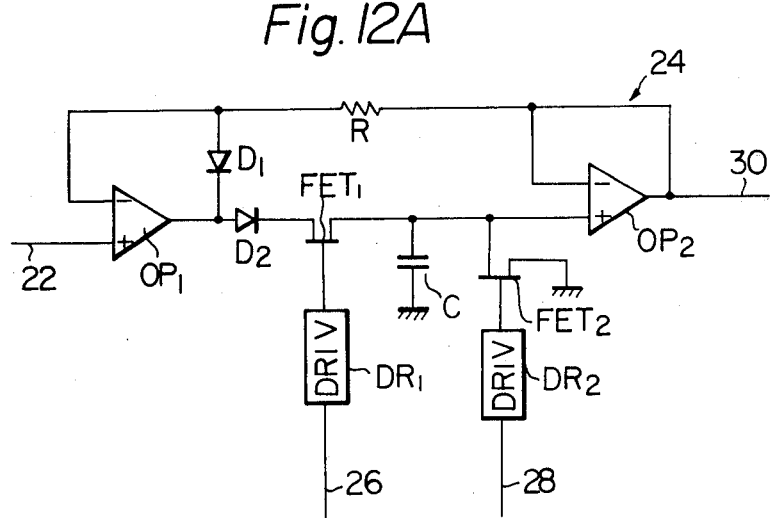
Figure 12B:
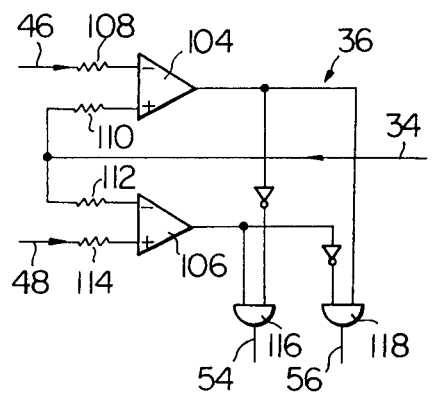
Figure 13:
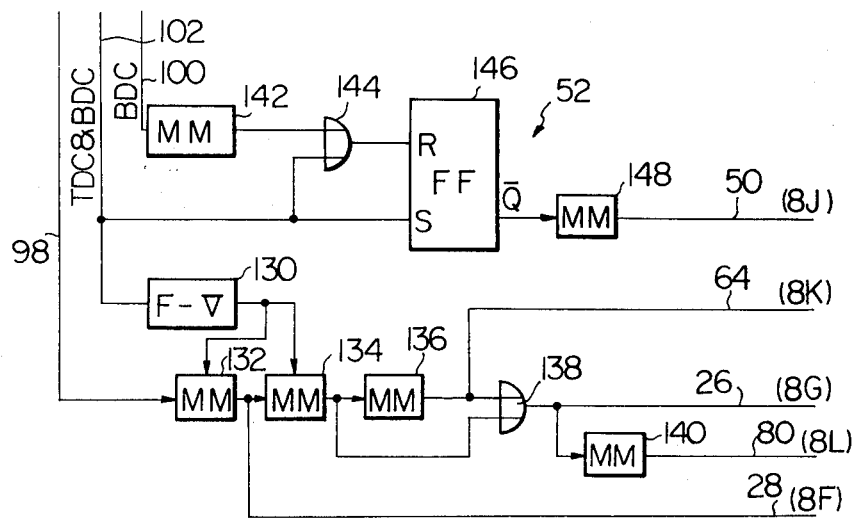
Figure 14:
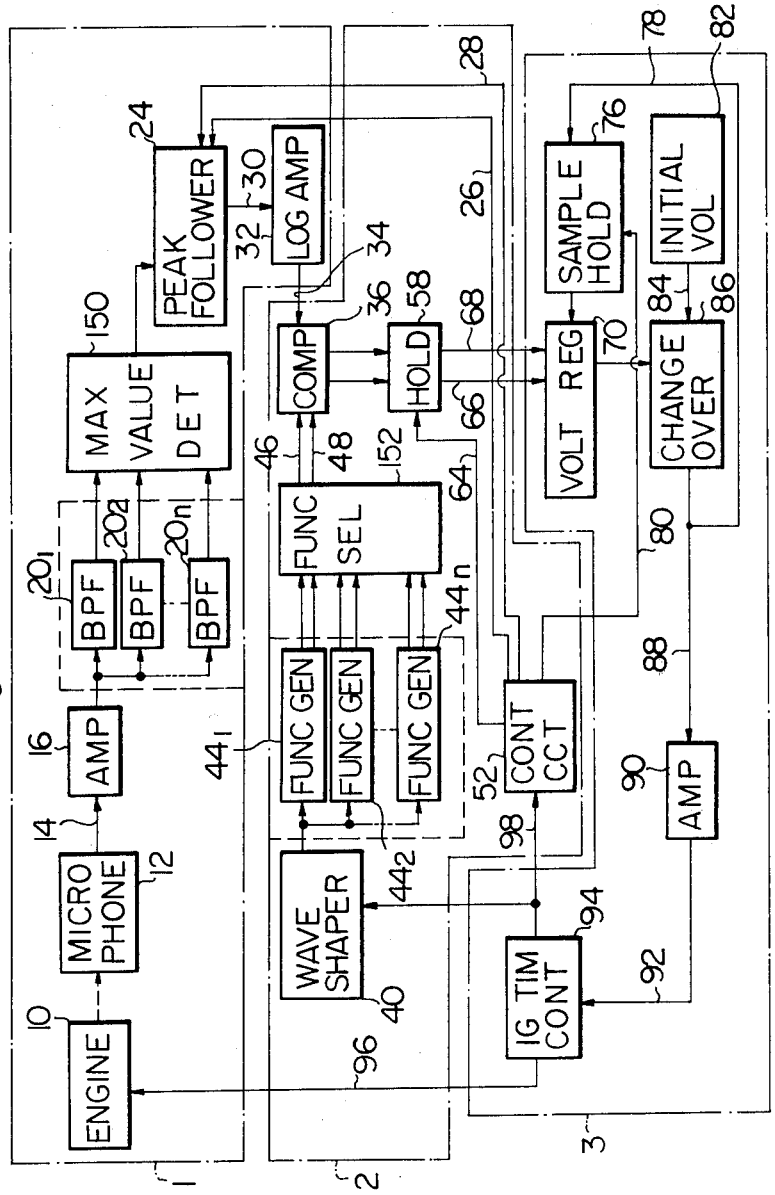
Figure 15:
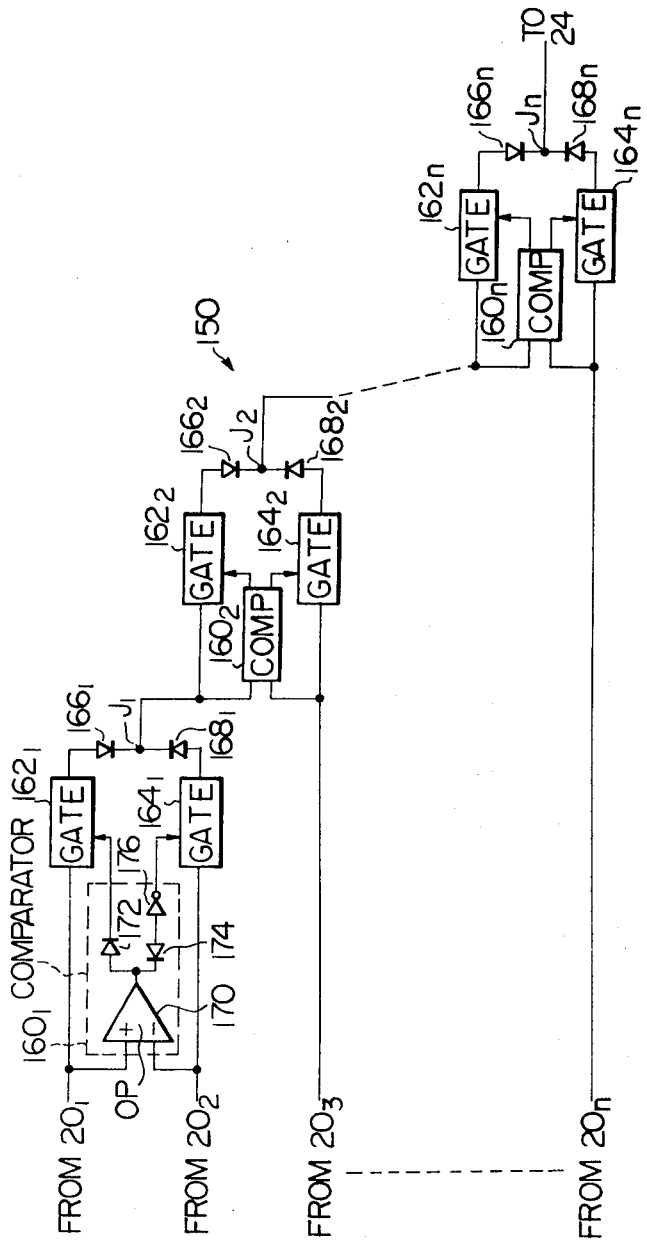

FIGS. 5-$a$ and 5-$b$ are diagrams respectively showing frequency spectra of a sound emitted from an automobile internal combustion engine;

FIG. 6 is a diagram illustrating sound pressure levels of frequency components within a particular frequency band with reference to engine speeds;

FIG. 7 is a schematic block diagram of a preferred circuit arrangement according to the present invention;

FIG. 8 is a diagram illustrating output voltages of a function generator of the circuit of FIG. 7;

FIG. 9 illustrates waveforms of a signal appearing in various points of the circuit of FIG. 7;

FIG. 10 illustrates variations of ignition timing and engine speed with reference to time when an automobile internal combustion engine is operated in cooperation with an apparatus according to the present invention;

FIG. 11 illustrates peak values generated from a peak follower of the circuit of FIG. 7 and variations of ignition timing with reference to the peak values;

FIGS. 12A and 12B are circuit diagrams of parts of the apparatus of FIG. 7;

FIG. 13 is a circuit diagram of a part of the apparatus of FIG. 7;

FIG. 14 is circuit diagram of another embodiment of the present invention;

FIG. 15 is a circuit diagram of a part of the apparatus of FIG. 14; and

FIGS. 16 through 21 are circuit diagrams of other embodiments of the present invention.

Referring now to the drawings and more specifically to FIG. 1, there is illustrated a so-called Borderline knock curve. The curve is depicted by plotting several points such as $P_1$, $R_2$, . . . $P_7$. The lower and upper regions of the curve are referred to as "non-knock" and "knock" regions, respectively.

In FIG. 2, there are illustrated various Borderline knock curves. A broken curve is a Borderline knock curve on a sample fuel and solid curves are those on standard fuels of octane numbers 90, 85, 75, 70 and 65.

Figure 3:
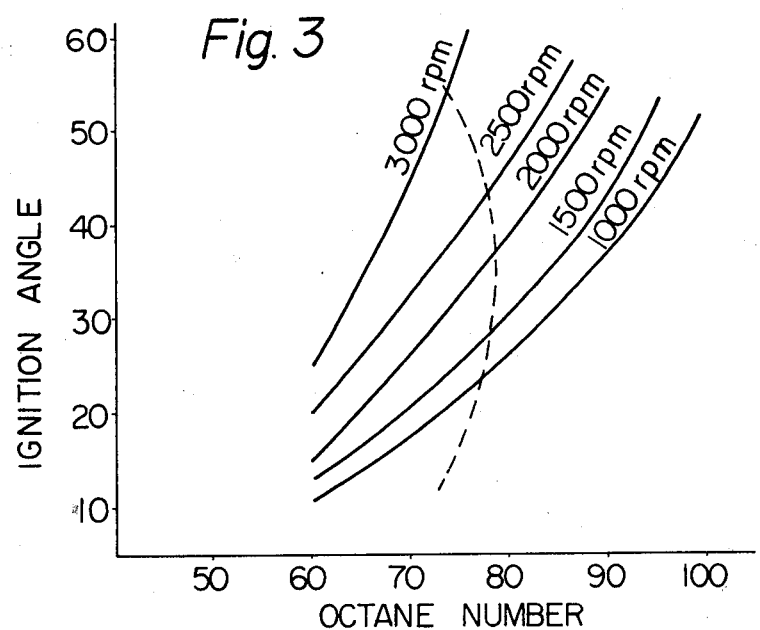
FIG. 3 is a diagram showing curve illustrating relationships of ignition timings versus road octane number obtained through a conversion from the curves of FIG. 2.

In FIG. 3, curves are illustrated which are obtained through parameter substitution from those curves of FIG. 2.

Figure 4:
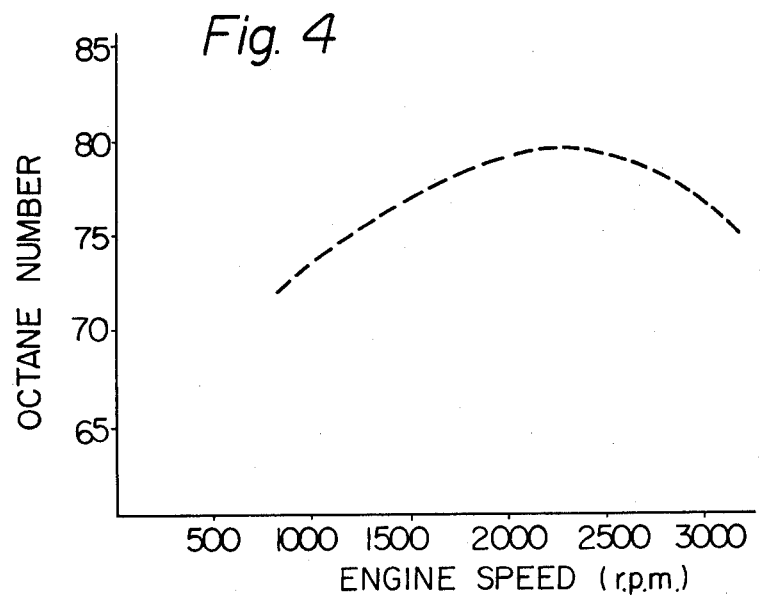
FIG. 4 is a diagram showing a curve of the same shape as a broken line in FIG. 3, which illustrates road octane numbers versus engine speeds.

In FIG. 4, there is illustrated a curve of road octane number obtained from the graph of FIG. 3.

It is now apparent from the above-description that the road octane number can be obtained from the Borderline knock curves on an internal combustion engine. However, difficulty has been encountered in determining the knock intensity by ear and it is proposed by the present invention to measure the knock intensity by a suitable device. Sounds from an automobile internal combustion engine are analyzed as shown in FIGS. 5-$a$ and 5-$b$. In these figures, solid lines correspond to knock conditions and broken lines correspond to non-knock conditions. It is apparent from these figures that remarkable sound level differences are appreciated only around a specific central frequency $f_0$ at both engine speeds of 1500 r.p.m. and 3000 r.p.m. It was revealed through repeated experiments by the Applicants that large sound level variations take place only in frequency components within a frequency range the central frequency of which is substantially constant even through the engine speed varies.

Such sound level variation of a frequency component of the frequency $f_0$ are measured in terms of the engine speed and the results are illustrated in FIG. 6.

The above-mentioned property of the knock sound emitted from an internal combustion engine is utilized in knock level control apparatus according to the present invention. A preferred circuit arrangement of an apparatus of the invention is illustrated in FIG. 7, which generally comprises a knock voltage generating circuit 1 for generating knock voltage representing the knock level of an internal combustion engine 10, a knock level discriminating circuit 2 for producing an advance signal or a retard signal in accordance with the knock voltage, and an ignition timing control circuit 3 for controlling the ignition timing of the engine 10 in accordance with the advance or retard signals. The knock voltage generating circuit 1 comprises a microphone 12 for converting sounds from the internal combustion engine 10 of, for example, four cylinders into an electric signal containing various frequency components. The electric signal from the microphone 12 is applied through a line 14 to an amplifier 16. The amplified electric signal is applied through a line 18 to a band pass filter 20 which passes therethrough only frequency components within a range around a central frequency such as the frequency $f_0$. The output signal of the band pass filter 20 is applied through a line 22 to a peak follower 24 which, on the other hand, receives through a line 26 a gate pulse signal and is operative only when it is triggered by the gate signal. The gate pulse signal has such a waveform as shown in FIG. 8H. The peak follower 24 is reset by a reset pulse signal having such a waveform as shown in FIG. 8F. Since the peak follower 24 is operative only during the pulse width of each gate pulse, the peak follower 24 is not influenced by noises generated at ignition of the engine 10. As is well known, the peak follower 24 is one type of integrator and adapted to produce a voltage equal to a peak value of a fluctuating voltage applied thereto until it is reset by a reset pulse signal. The output voltage from the peak follower 24 is applied through a line 30 to a logarithmic amplifier 32 the output signal of which is applied through a line 34 to a comparator 36. The logarithmic amplifier 32 is used for converting the peak voltage into values of dB unit so as to suppress the range in amplitude of the output signal from the peak follower 24.

A couple of pick-up elements 38$a$ and 38$b$ respectively produces spike pulses appearing at top and bottom dead centers of the piston of the engine. The spike pulses have such waveforms as shown in FIGS. 8A and 8B, respectively. The spike pulses are applied to a wave shaper 40 which produces a BDC pulse signal having such a waveform as shown in FIG. 8C and a TDC and BDC signal having such a waveform as shown in FIG. 8D. The BDC signal is applied through a line 42 to a function generator 44 which produces upper level and lower level pulse signals on lines 46 and 48 in response to a trigger pulse signal applied thereto through a line 50 from a control circuit 52. The lower level pulse signal has such a waveform as shown in FIG. 8H and the upper level pulse signal has a waveform similar to that of the lower level pulse signals but larger in amplitude. The amplitudes of the upper and lower level pulse signals are dependent upon the engine speed in such a manner as illustrated in FIG. 9. The trigger pulse signal has such a waveform as illustrated in FIG. 8J. The comparator 36 compares the input signal of line 34 with the upper and lower level pulse signals and produces a logic "1" signal on a line 54 when the input signal is lower than the lower level pulse signal and produces a logic "1" signal on a line 56 when the input signal is higher than the upper level pulse signal. The signals of lines 54 and 56 are respectively applied to set terminals of first and second flip-flop circuits 58 and 60 of a holding circuit 62. The flip-flop circuits are respectively set by the logic "1" signal applied to their set terminals when they are excited by a timing pulse signal applied to their set pedestal terminals. The timing pulse signal has such a waveform as shown in FIG. 8K. The Q terminals of the flip-flop circuits 58 and 60 are connected through lines 66 and 68 to a voltage regulator 70. The output signals of the flip-flop circuits 58 and 60 are utilized by the voltage regulator 70 as "advance" and "retard" signals, respectively. The flip-flop circuits 58 and 60 are respectively reset at, for example, the trailing edge of each of upper and lower level pulses although not illustrated in this instance for the simplicity of explanation. The voltage regulator 70 produces an output voltage deviated from an input voltage applied thereto through a line 74 from a sample hold circuit 76 in accordance with either the advance or retard signal. The sample hold circuit 76 is adapted to produce a voltage equal to a voltage applied thereto through a line 78 at a moment when a sample pulse applied thereto through a line 80 from the control circuit 52. An initial voltage generator 82 produces a preselected initial voltage which is applied through a line 84 to a change-over circuit 86. The change-over circuit 86 selectively passes therethrough one of the input voltages applied thereto through lines 72 and 84. The output voltage of the change-over circuit 86 is applied through a line 88 to an amplifier 90. The amplified voltage is applied through a line 92 to an ignition timing controller 94 which produces on line 96 an ignition signal in accordance with the intensity of the voltage applied thereto from the amplifier 90. The ignition signal has such a waveform as shown in FIG. 8E. The ignition signal is applied through a line 96 to the engine 12 and through a line 98 to the control circuit. The TDC and BDC signal and BDC signal are respectively applied through lines 100 and 102 to the control circuit 52.

When the engine 12 is operated together with the apparatus mentioned above while the engine speed is varied by, for example, varying the opening of the throttle valve (not shown), the ignition timing and the engine speed vary in such a manner as illustrated in FIG. 10.

In FIG. 11, there is illustrated in enlarged scale a variation of the ignition angle with reference to peak values generated from the peak follower 24.

In FIG. 12A, there is shown a circuit arrangement of the peak follower 24 which includes a first operational amplifier $OP_1$ having its non-inverting input connected to the line 22 and its inverting input connected through a resistor R to an inverting input and an output of a second operational amplifier $OP_2$ and through a diode $D_1$ to its own output. The output of the operational amplifier $OP_1$ is further connected through a diode $D_2$ to a source terminal of a field effect transistor $FET_1$ a gate terminal of which is connected through a driver $DR_1$ to the line 26. A drain terminal of the transistor $FET_1$ is connected through a storing capacitor C to the ground and to a source terminal of a field effect transistor $FET_2$ and to a non-inverting input of the operational amplifier $OP_2$. The transistor $FET_2$ has its gate terminal connected through a driver $DR_2$ to the line 28 and its drain terminal connected to the ground.

The operation of the above-mentioned circuit is not explained in this specification since the above-described circuit is well known in the art.

In FIG. 12B, there is shown a circuit arrangement of the comparator 36, which includes a pair of operational amplifiers 104 and 106. The operational amplifier 104 has its inverting input connected through a resistor 108 to the line 46 and its non-inverting input connected through a resistor 110 to the line 34. The operational amplifier 106 has its inverting input connected through a resistor 112 to the line 34 and its non-inverting input connected through a resistor 104 to the line 48. The output of the operational amplifier 104 is connected to input terminals of AND gates 116 and 118. The output of the operational amplifier 106 is connected to the remaining input terminals of the AND gates 116 and 118. The respective outputs of the AND gates 116 and 118 are connected to the lines 54 and 56.

In FIG. 13, there is shown a circuit arrangement of the control circuit 52 which includes a frequency voltage converter 130 for producing a voltage proportional to the repetition frequency of the TDC and BDC signal from the line 102. The output voltage of the frequency voltage converter 130 is applied to monostable multivibrators 132 and 134 which are arranged to change the length of their quasi-stable period in inversely proportional to the intensity of the voltage from the frequency voltage converter 130. An output terminal of the monostable multivibrator 132 is connected to an input terminal of the monostable multivibrator 134 and to the line 28. An output terminal of the monostable multivibrator 134 is connected to an input terminal of a monostable multivibrator 136 and to one input of an OR gate 138 an output of which is connected to the line 26 and through a monostable multivibrator 140 to the line 80. An output terminal of the monostable multivibrator 136 is connected to the other input of the OR gate 138 and to the line 64. A monostable multivibrator 142 has its input terminal connected to the line 100 for receiving the BDC signal and its output terminal connected to one input of an OR gate 144. The other input of the OR gate 144 is connected to the line 102 and a set terminal of a flip-flop circuit 146 a reset terminal of which is connected to an output of the OR gate 144. The Q terminal of the flip-flop circuit 146 is connected to an input terminal of a monostable multivibrator 148 which has its output terminal connected to the line 50.

Although, as mentioned above, the central frequency of the knocking sound is generally constant in an internal combustion engine, the central frequency is subject to fluctuation in some cases even though the fluctuation is not so large. Further, the knocking level variation pattern with respect to variation of engine speed is in some cases appreciably dependent upon the types of engines.

In view of the above-mentioned facts, an improved apparatus is proposed according to the present invention, which is illustrated in FIG. 14. This apparatus has the same construction as the apparatus of FIG. 7 except that it includes a plurality of band pass filters $20_1$, $20_2$, ... and, $20_n$ instead of the single band pass filter 20 and a plurality of function generators $44_1$, $44_2$, ... and, $44_n$ instead of the function generator 44. This apparatus further includes a maximum value detector 150 which has its input terminals respectively connected to output terminals of the band pass filters and its one output terminal connected to the peak follower 24. The maximum value detector 150 is adapted to produce a voltage equal to a maximum voltage of input voltages applied thereto from the filters. The function generators $44_1$, $44_2$, ... and $44_n$ are similar to the function generator 44 but respectively produce pulse signals different from one another in amplitude. A function selector switch 152 has its input terminals respectively connected to output terminals of the function generators $44_1$, $44_2$, ... and $44_n$. The selector switch 152 selectively connects a pair of ones of its input terminals to its a pair of output terminals in accordance with a characteristic of an internal combustion engine to be controlled by the apparatus.

In FIG. 15, there is shown an example of the maximum value detector 150 which is constituted by $n$ number of comparing and gating arrangements. A first comparing and gating arrangement includes a comparator $160_1$ having its input terminals respectively connected to the filters $20_1$ and $20_2$ and its output terminals respectively connected to trigger terminals of a pair of transmission gates $162_1$ and $164_1$. The transmission gates $162_1$ and $164_1$ are respectively interposed between the filter $20_1$ and a diode $166_1$, and the filter $20_2$ and a diode $168_1$ so that the gates $162_1$ and $164_1$ pass therethrough signals from the filters $20_1$ and $20_2$ to the diodes $166_1$ and $168_1$, respectively, when they are triggered by trigger signals applied their trigger terminals. The comparator $160_1$ includes an operational amplifier 170 having its non-inverting and inverting inputs connected to the input terminals of the comparator 160. A diode 172 has its anode connected to an output terminal of the amplifier 170 and its cathode connected to the trigger terminal of the gate $162_1$. A diode 174 has its cathode connected to the output terminal of the amplifier 170 and its anode connected through a NOT circuit 176 to the trigger terminal of the gate $164_1$. A junction $J_1$ between the diodes $166_1$ and $168_1$ is connected to an input of a transmission gate $162_1$ and one input of a comparator $160_2$ the same type as the comparator $160_1$. The other input of the comparator $160_2$ is connected to the output of the filter $20_3$ and to an input of a transmission gate $164_2$. Output terminals of the comparator $160_2$ are respectively connected to trigger terminals of the gates $162_2$ and $164_2$. The gates $162_2$ and $164_2$ have their outputs respectively connected to anodes $166_2$ and $168_2$ cathode of which are connected with each other at a junction $J_2$. The comparator $160_2$, gates $162_2$ and $164_2$, and diodes $166_2$ and $168_2$ constitute a second comparing and gating arrangement. The remaining comparing and gating arrangements have the same construction as those arrangements as above-mentioned.

The apparatus mentioned above are so arranged as to detect knock sounds and to compare the knock level with a predetermined voltage to control the ignition timing of the engine. However, it was revealed that the knocking level controlling can be more precisely and desirably performed by discriminating not only the intensity of knocking sounds but also the rate of appearance of knocking sounds during a unit time.

Figure 16:
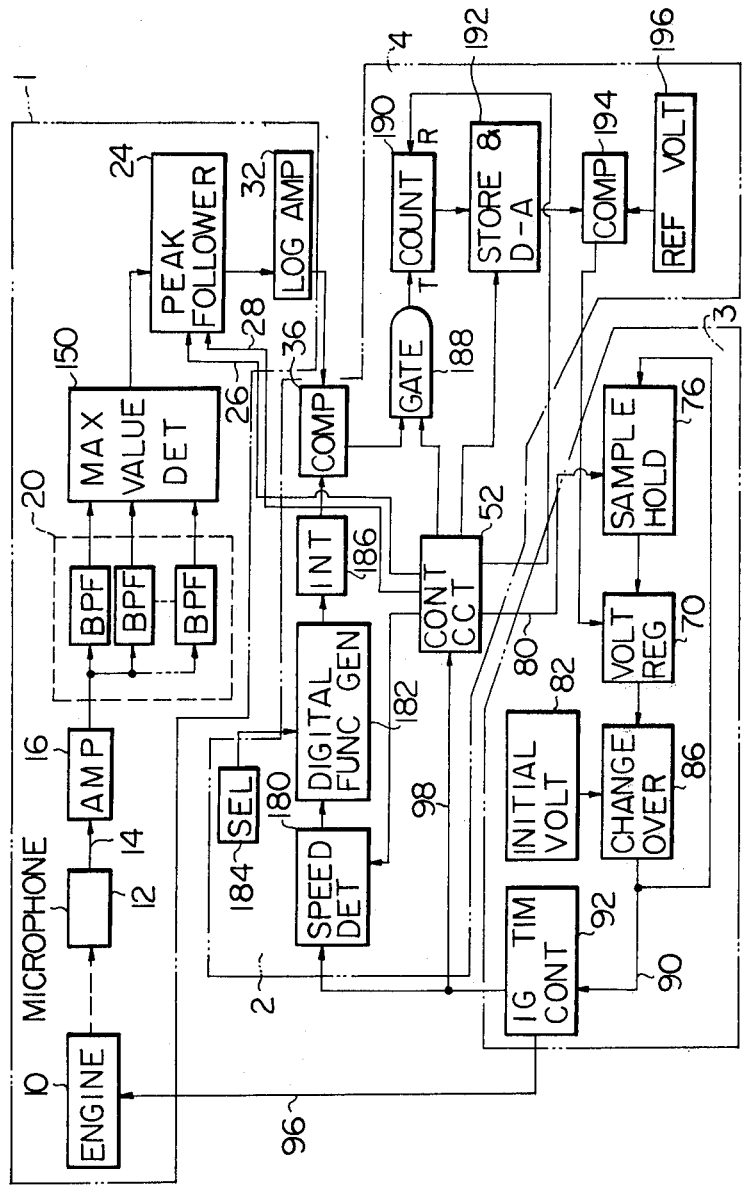

Therefore, an improved knocking level controlling apparatus is provided which is illustrated in FIG. 16. This apparatus has substantially the same construction as that of FIG. 14, except that the knocking level discriminating circuit 2 is somewhat modified from that of FIG. 14. The circuit 2 includes an engine speed detector 180 for producing an engine speed pulse signal of a repetition frequency proportional to that of ignition pulse signal from the ignition timing controller 92. The engine speed pulse signal is applied to a digital function generator 182 which produces a pulse train in response to the engine speed pulse signal from the detector 180 and an indication signal from a function selector 184. The function selector 184 produces the indication signal in accordance with the type or kind of the engine 12 since the Borderline curve is dependent upon the type or kind of the engine. The pulse train is applied to an integrator 186 which produces a pulse signal having an amplitude in proportional to the number of pulses applied thereto. The comparator 36 compares the pulse signal with the output voltage from the logarithmic amplifier 32 and to produce a logic "1" signal when the output voltage exceeds the voltage from the integrator 186. The logic "1" signal is applied to one input of an AND gate 188 which passes therethrough the logic "1" signal to a trigger terminal of a counter 190 as long as a gate signal is applied to the other terminal of the gate 188 from the control circuit 52. Since the gate signal has a pulse width of a unit time, the counter counts the number of appearance of knocking per unit time. The digital information in the counter 190 is transferred to a storing and digital to analogue converting circuit 192 when the circuit 192 is triggered by a pulse from a control circuit 52. The circuit 192 produces a voltage representing the digital information of the counter 190. The voltage is applied to a comparator 194 which produces a logic "1" signal when the voltage from the circuit 192 exceeds a reference voltage from a reference voltage generator 196. The logic "1" signal from the comparator 194 is applied to the voltage regulator 70. The voltage regulator 70 regulates the voltage from the sample hold circuit 76 in accordance with the logic "1" signal from the comparator 194.

It is now apparent from the above description that the apparatus of FIG. 16 controls the knocking level in accordance with not only the intensity of knocking sound but also the rate of appearance of knocking so that precise and desired knocking level control is performed.

Figure 17:
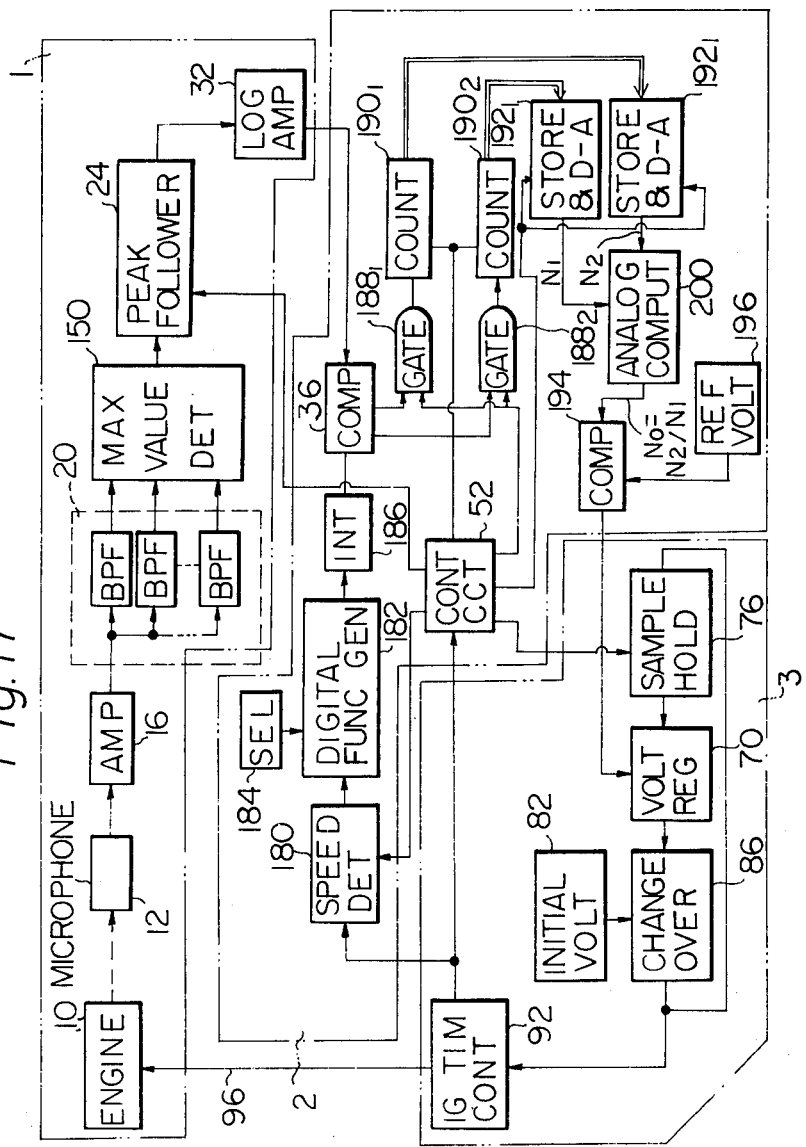

In FIG. 17, there is shown another apparatus according to the present invention which has substantially the same construction as that of FIG. 16, except that each of the digital function generator 182, the integrator 186 and the comparator 36 has a pair of output terminals and the next stage of the comparator 36 includes a pair of systems for respectively counting the rate of appearance of knocking and non-knocking per unit time. The digital function generator 182 produces a pair of pulse train in accordance with the engine speed pulse signal from the speed detector 180. The pair of pulse trains corresponds to the upper and lower level voltages of the Borderline curve. The integrator 186 thus produces a pair of pulse signals respectively having amplitude corresponding to the upper and lower level voltages which are applied to the comparator 36. The comparator 36 produces a logic "1" signal on its one output terminal when the knocking voltage from the logarithmic amplifier 32 exceeds the upper level voltage and a logic "1" signal on its other output terminal when the knocking voltage is lower than the lower level voltage. Gates $188_1$ and $188_2$ pass therethrough logic "1" signals from the comparator 36 when they are triggered by a pulse signal having a pulse width of a unit time from the control circuit 52. Output pulses from the gates $188_1$ and $188_2$ are counted by a pair of counters $190_1$ and $190_2$. Digital information in the counters $190_1$ and $190_2$ is transferred to a pair of storing and digital to analogue converting circuits $192_1$ and $192_2$ which then produces analogue signals respectively representing the numbers ($N_1$, $N_2$) of pulses from the comparator 36. An analogue computing circuit 200 produces an output voltage representing a proportion ($N_O$) of $N_2$ to $N_1$. The comparator 194 compares the voltage from the circuit 200 with a predetermined reference voltage 196 and to produce a logic "1" signal when the voltage from the circuit 200 exceeds the reference voltage.

It is now apparent that the apparatus of FIG. 17 controls the knocking level in accordance with not only the intensity of the knock voltage but also the proportion of the rate of non-knocking to the rate of knocking during a unit time.

Figure 18:
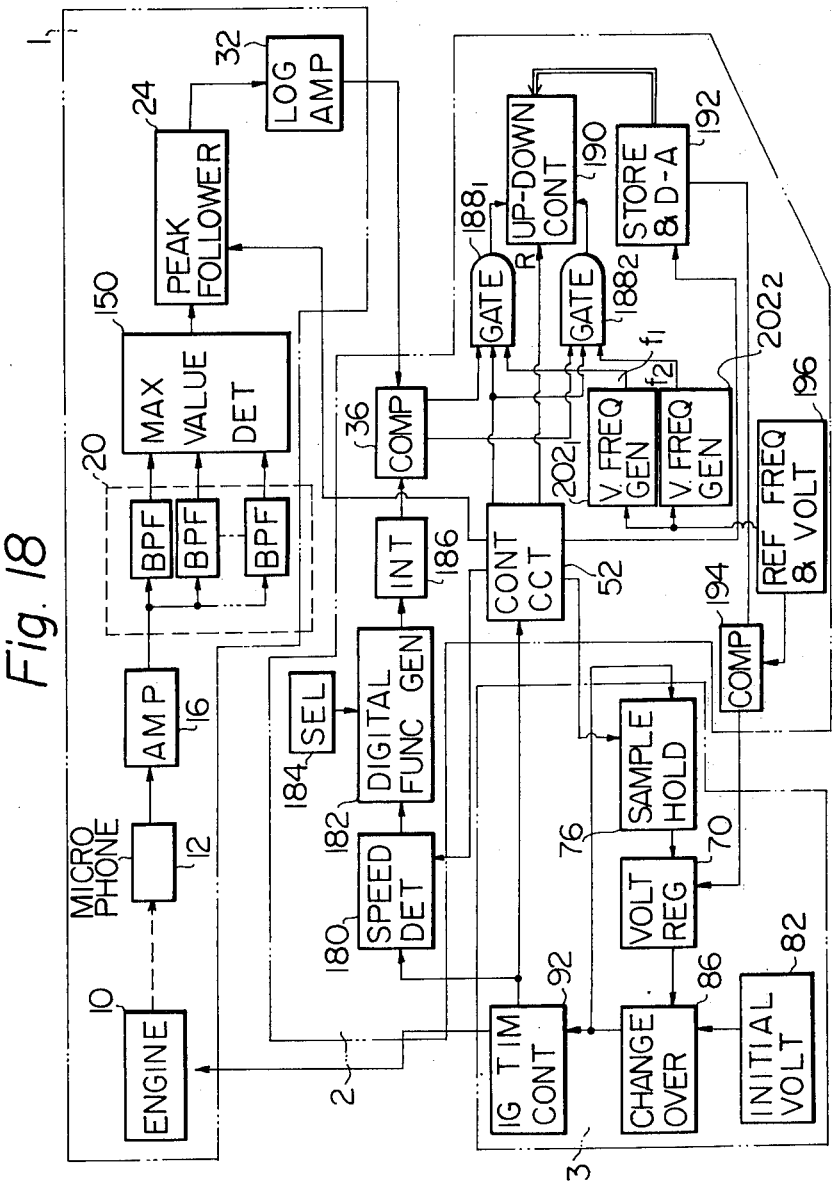

In FIG. 18, there is shown another apparatus according to the present invention, which has substantially the same construction as that of FIG. 17 except that each of AND gates $188_1$ and $188_2$ have three inputs. The AND gates $188_1$ and $188_2$ are respectively triggered by different frequencies of $f_1$ and $f_2$ supplied from variable frequency generators $202_1$ and $202_2$. The frequencies passed through the AND gates $188_1$ and $188_2$ are counted by an up-down counter 190. The counter 190 is reset by reset pulses supplied through its reset terminal from the control circuit 52. Digital information in the up-down counter 190 corresponds to a rate of $f_1/f_2$. The digital information is transferred to a storing and digital-to-analogue converting circuit 192 when the circuit 192 is triggered by a trigger signal from the control circuit 52. A reference frequency and voltage generator 196 supplies a reference voltage to a comparator 194 and a reference frequency to the variable frequency generators $202_1$ and $202_2$. The reference voltage is regulated in accordance with the rate of $f_1/f_2$.

The duration of pulse signals supplied from the comparator 36 to the gates $188_1$ and $188_2$ are respectively sampled by the frequencies $f_1$ and $f_2$. The sampled signals are counted by the up-down counter 190. Thus, this apparatus also control the knocking level by detecting the rate of knocking to non-knocking times.

Figure 19:
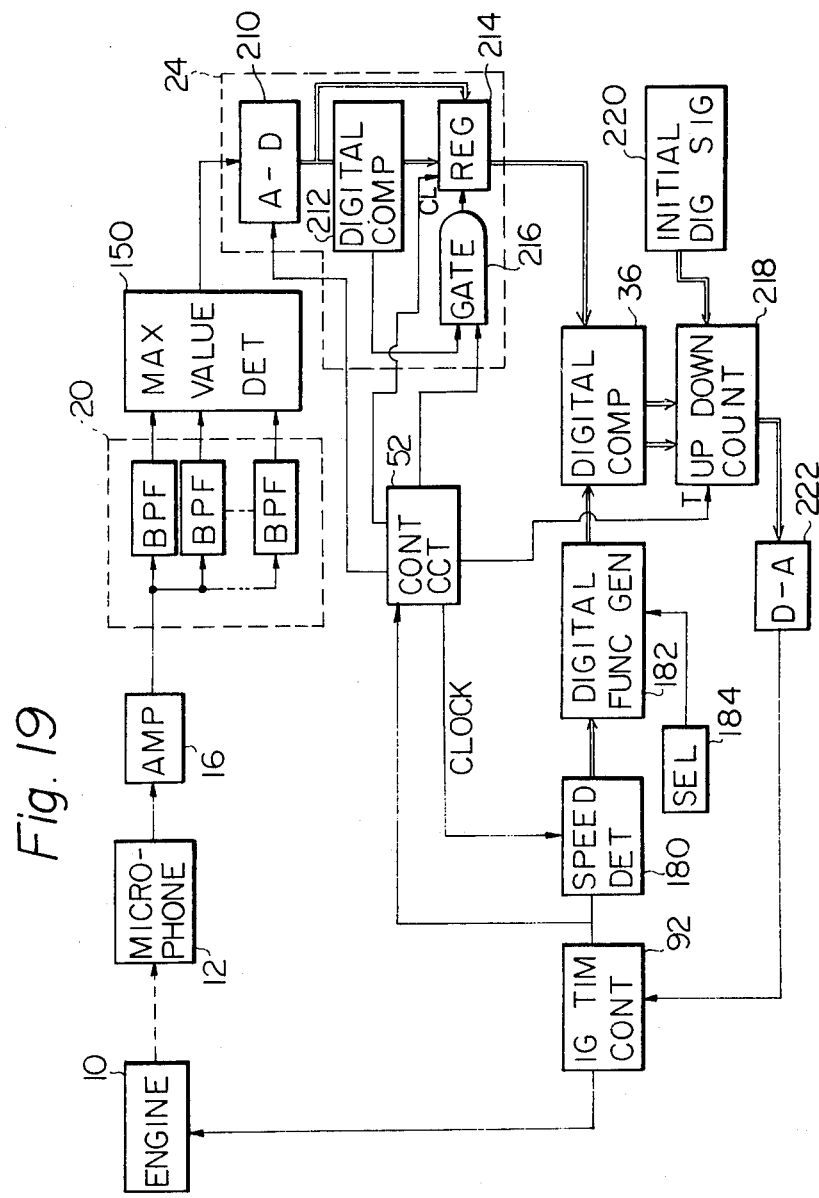

Since the above-described apparatus includes relatively many analogue circuits such as logarithimic amplifier which are relatively costly, the overall apparatus is relatively costly. Therefore, a relatively economical apparatus of digital system is provided according to the invention, which is shown in FIG. 19. This apparatus includes one or more microphones 10 for detecting sounds from an internal combustion engine 12. The output signal from the microphones 10 is amplified and supplied to a group of band pass filters 20. The output signals from the band pass filters 20 are supplied to a maximum value detector 150 the same as those of the proceeding apparatus. The output signal from the maximum value detector 150 is supplied to an analogue-to-digital converter 210 which produces digital information representing the peak value applied thereto. The digital information is applied to a digital comparator 212 and a register 214. The digital comparator 212 compares the digital signal from the A-D converter with the digital signal from the register and produces a logic "1" signal when the signal from the converter 210 is larger than that from the register 214. The logic "1" signal is applied to one input of an AND gate 216 which then passes therethrough a trigger signal from a control circuit 52 to a trigger terminal of the register 214. The register 214 newly stores therein the digital information while cancelling the proceeding information stored therein when it is triggered by the trigger signal. Thus, the register 214 stores therein digital signal representing a peak value of the signal applied to the A-D converter 210. Accordingly, the converter 210, digital comparator 212, a register 214 and the AND gate 216 constitute a peak follower 24 of digital type. The digital signal from the register 214 is applied to a digital comparator 36 which compares the digital signal with a digital signal from a digital function generator 182. The digital function generator produces the digital function signal in response to a speed pulse signal from a speed detector 180 and an indication signal from a function selector 184. The digital comparator 36 produces first and second difference signals respectively representing difference between input signals applied to the comparator 36, first signal being produced when the signal from the register 214 is larger than the signal from the function generator 182 and the second signal being produced the signal from the register 214 is smaller than the signal from the function generator 182.

An up-down counter 218 counts the first and second signals in additive and subtractive modes when it is triggered by a trigger signal from the control circuit 52. The up-down counter 218 stores therein an initial digital signal from an initial digital signal generator 220 at the first stage. The output signal of the counter 218 is converted into an analogue signal by an digital-to-analogue converter 222. The analogue signal is applied to an ignition timing controller 92 which then controls the ignition timing of the engine 12 in accordance with the analogue signal.

Figure 20:
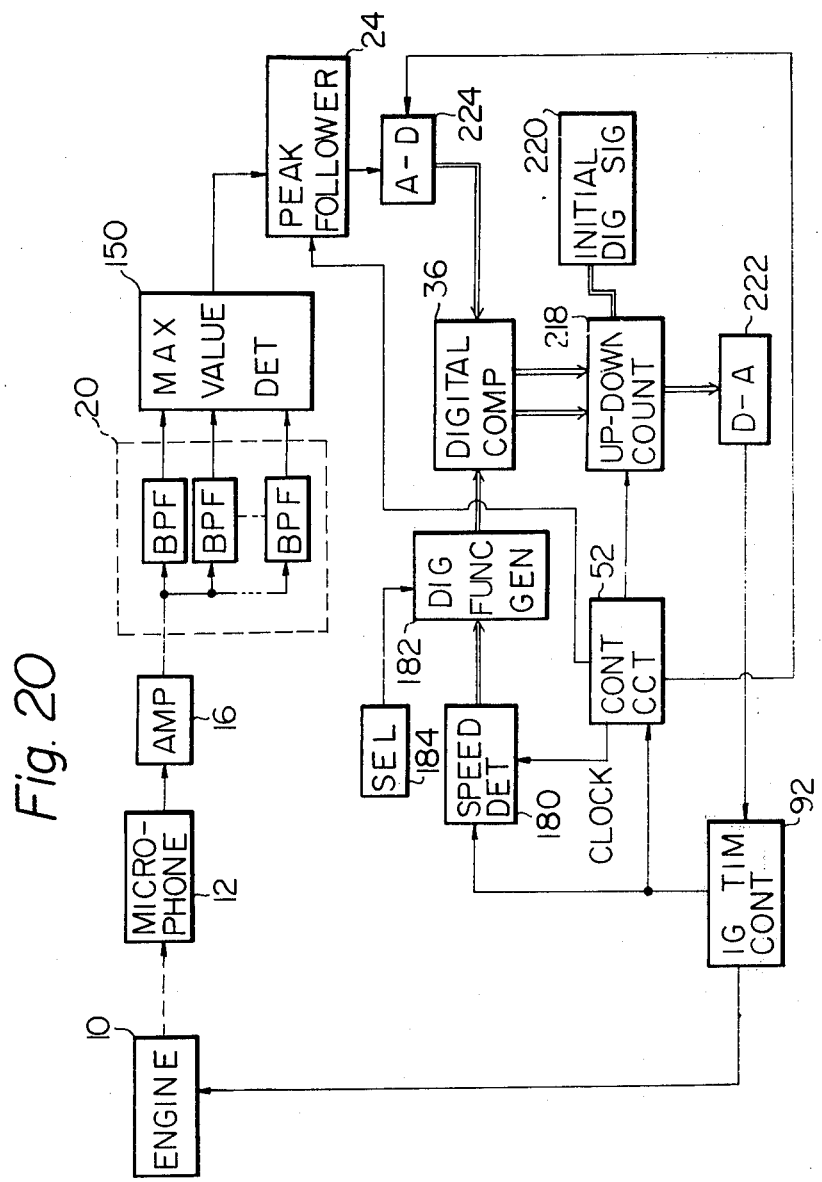

FIG. 20 shows another apparatus of the present invention which has the same construction as that of FIG. 19 except that an analogue peak follower 24 the same as that of FIG. 7 is used instead of the digital peak follower 24 of FIG. 19. An analogue-to-digital converter 224 converts an analogue output signal from the peak follower 24 into a digital signal which is applied to a digital comparator.

The operation of this apparatus is the same as that of FIG. 19. However, a slow-speed A-D converter can be used for the A-D converter 224 while the A-D converter 210 of the apparatus of FIG. 19 is to be a high-speed one.

Figure 21:
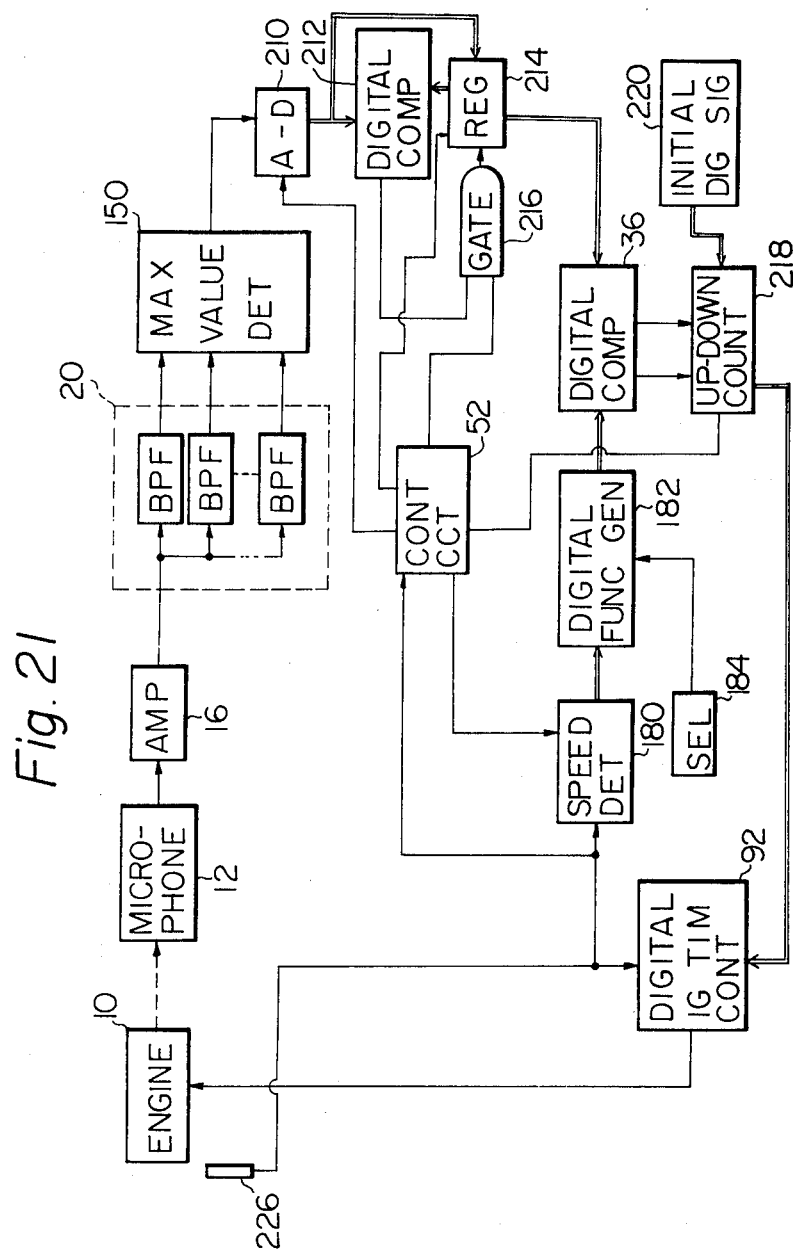

FIG. 21 shows another apparatus of the present invention which is modified from that of FIG. 19. This apparatus has the same construction as that of FIG. 19 except that the D-A converter 222 is omitted and a digital ignition timing controller 92 is used. The digital ignition timing controller performs its operation in accordance with digital signal from the up-down counter 218 and a crank angle signal from a crank angle pick-up element 226.

The operation of the apparatus of FIG. 21 is substantially the same as that of FIG. 19.

It should be appreciated that those apparatus of FIGS. 19, 20 and 21 are economical since those can utilize digital elements which are commercially available. Furthermore, those digital type of apparatus can be readily prepared for operation through simple adjustments of elements.

The detailed description of the preferred embodiments of the invention for the purpose of explaining the principles thereof is not to be considered as limiting or restricting the invention, since many modifications may be made by the exercise of skill in the art.

What is claimed is:

1. A knock level control apparatus for an internal combustion engine, which comprises:
    converting means for converting sounds emitted from said internal combustion engine into electrical signals;
    knock voltage generating means for generating a knock voltage representing a maximum voltage of frequency components of said electrical signal within a predetermined frequency band width, said knock voltage generating means including, a plurality of band pass filters each for exclusively passing therethrough frequency components of said electrical signal within a predetermined frequency band, the respective frequency bands of the filters being different from one another, a maximum value detector for passing therethrough a maximum one of frequency components passed through said band pass filters, a peak follower for producing a peak voltage equal to a maximum voltage of said maximum one of the frequency components, and a logarithmic amplifier for logarithmically amplifying said peak voltage;
    knock level discriminating means for producing a retard signal when said knock voltage exceeds a higher predetermined level and an advance signal when said knock voltage lowers below a predetermined level; and
    ignition timing control means for controlling the ignition timing of said internal combustion engine in accordance with said advance and retard signals.

2. A knock level control apparatus for an internal combustion engine, which comprises:
    converting means for converting sounds emitted from said internal combustion engine into electrical signals;
    knock voltage generating means for generating a knock voltage representing a maximum voltage of frequency components of said electric signal within a predetermined frequency band width;
    knock level discriminating means for producing a retard signal when said knock voltage exceeds a higher predetermined level and an advance signal when said knock voltage lowers below a lower predetermined level, said knock level discriminating means including, an engine speed detector for producing an engine speed signal, a function generator for generating higher and lower reference voltages respectively equal to said higher and lower predetermined levels, a comparator for comparing said knocking voltage with said higher and lower reference voltages so as to produce advance and retard signals, a holding circuit for storing said advance and retard signals when it is triggered by a timing pulse, control means for producing said timing pulse, said comparator including a first operational amplifier adapted to receive said higher reference voltage through the inverting input thereof and said knocking voltage through the non-inverting input thereof, a second operational amplifier adapted to receive said lower reference voltage through the non-inverting input thereof and said knocking voltage through the inverting input thereof, a first AND gate having one input thereof connected direct to the output of said first operational amplifier and the other input thereof connected through a NOT circuit to the output of said second operational amplifier, and a second AND gate having one input thereof connected through a NOT circuit to the output of said first operational amplifier and the other input thereof connected direct to the output of said second operational amplifier; and
    ignition timing control means for controlling the ignition timing of said internal combustion engine in accordance with said advance and retard signals.

3. A knock level control apparatus for an internal combustion engine, which comprises:

converting means for converting sounds emitted from said internal combustion engine into electrical signals;

knock voltage generating means for generating a knock voltage representing a maximum voltage of frequency components of said electrical signal within a predetermined frequency band width;

knock level discriminating means for producing a retard signal when said knock voltage exceeds a higher predetermined level and an advance signal when said knock voltage lowers below a lower predetermined level, said knock level discriminating means including, an engine speed detector for producing an engine speed signal, at least two function generators each for producing a pair of higher and lower reference voltages, a selector for selectively passing therethrough one pair of higher and lower reference voltages from said function generators, a comparator for comparing said knocking voltage with said pair of higher and lower reference voltages passing through said selector so as to produce said advance and retard signals, a holding circuit for storing and holding said advance and retard signals when it is triggered by a timing pulse, and control means for producing said timing pulse; and ignition timing control means for controlling the ignition timing of said internal combustion engine in accordance with said advance and retard signals.

4. A knock level control apparatus for an internal combustion engine, which comprises:

converting means for converting sounds emitted from said internal combustion engine into electrical signals;

knock voltage generating means for generating a knock voltage representing a maximum voltage of frequency components of said electrical signal within a predetermined frequency band width;

knock level discriminating means for producing a retard signal when said knock voltage exceeds a higher predetermined level and an advance signal when said knock voltage lowers below a lower predetermined level; and ignition timing control means for controlling the ignition timing of said internal combustion engine in accordance with said advance and retard signals, said ignition timing control means including a control voltage generator for producing a control voltage in accordance with said advance and retard signals, an ignition timing controller for regulating the ignition timing in accordance with said control voltage, said control voltage generator including, an initial voltage generator for producing a predetermined initial voltage, a voltage regulator for regulating a sample-hold voltage in accordance with said advance and retard signals, a change-over circuit for selectively passing therethrough one of the regulated voltage from said voltage regulator and said initial voltage, a sample-hold circuit for sample-holding the voltage from said change-over circuit until it is triggered by a trigger pulse, and a control means for producing said trigger pulse.

5. A knock level control apparatus for an internal combustion engine, which comprises:

converting means for converting sounds emitted from said internal combustion engine into electrical signals;

knock voltage generating means for generating a knock voltage representing a maximum voltage of frequency components of said electrical signal within a predetermined frequency band width, said knock voltage generating means including, a plurality of band pass filters each for exclusively passing therethrough frequency components of said electrical signal within a predetermined frequency band, the respective frequency bands of the filters being different from one another, a maximum value detector for passing therethrough a maximum one of frequency components passed through the filters, an analogue-to-digital converter for converting said maximum one of frequency components into digital information, a register for storing said digital information therein when it is triggered by a trigger pulse, a digital comparator for comparing said digital information from said converter with the digital information stored in said register so as to produce a gate pulse when the former is larger in digit than the latter, and gate means for producing said trigger pulse when it receives said gate pulse;

knock level discriminating means for producing a retard signal when said knock voltage exceeds a higher predetermined level and an advance signal when said knock voltage lowers below a lower predetermined level; and ignition timing control means for controlling the ignition timing of said internal combustion engine in accordance with said advance and retard signals.

6. A knock level control apparatus as claimed in claim 5 in which said knock level discriminating means includes:

an engine speed detector for producing an engine speed signal;

a digital function generator for generating a digital function in accordance with said engine speed signal;

a digital comparator for producing a higher level pulse train when the digital information stored in said register is larger in digit than said digital function, the number of pulses of said higher level pulse train being dependent on the difference in digit between said digital function and said digital information from said register and for producing a lower lever pulse train when the digital information stored in said register is smaller in digit than said digital function, the number of pulses of said lower level pulse train being dependent on the difference in digit between said digital information from said register and said digital function;

an up-down counter for counting said higher level pulse train in additive mode and said lower level pulse train in subtractive mode; and an initial digital signal generator for supplying an initial digit signal to said up-down counter.

7. A knock level control apparatus as claimed in claim 6, in which said ignition timing control means includes:

a digital-to-analogue converter for converting digital information stored in said up-down counter into an analogue voltage; and an ignition timing regulator for regulating the ignition timing in accordance with said analogue voltage.

8. A knock level control apparatus for an internal combustion engine, which comprises:

converting means for converting sounds emitted from said internal combustion engine into electrical signals;

knock voltage generating means for generating a knock voltage representing a maximum voltage of frequency components of said electrical signal within a predetermined frequency band width, said knock voltage generating means including, a plurality of band pass filters each for exclusively passing therethrough frequency components of said electrical signal within a predetermined frequency band, the respective frequency bands of the filters being different from one another, a maximum value detector for passing therethrough a maximum one of frequency components passed through the filters, a peak follower for producing a peak voltage equal to a maximum voltage of said maximum one of the frequency components, and an analogue-to-digital converter for converting said peak voltage into digital information;

knock level discriminating means for producing a retard signal when said knock voltage exceeds a higher predetermined level and an advance signal when said knock voltage lowers below a lower predetermined level; and ignition timing control means for controlling the ignition timing of said internal combustion engine in accordance with said advance and retard signals.

9. A knock level control apparatus for an internal combustion engine, which comprises:

converting means for converting sounds emitted from said internal combustion engine into electrical signals;

knock voltage generating means for generating a knocking voltage representing a maximum voltage of frequency components of said electrical signal within a predetermined frequency band width;

knock level discriminating means for producing an advance or retard signal when said knocking voltage exceeds a function voltage according to the engine speed by times larger than a predetermined times, said knock level discriminating means including, an engine speed detector for producing an engine speed signal, a digital function generator for generating a pulse train of a repetition frequency according to said engine speed signal, an integrator for integrating said pulse train so as to produce a function voltage, a comparator for producing a trigger pulse when said knocking voltage exceeds said function voltage, counting means for counting the number of the trigger pulses appearing during a predetermined time period, storing and digital to analogue converting means for storing therein said number of trigger pulses and converting said number of trigger pulses into an analogue voltage, a reference voltage generator for generating a reference voltage, and a comparator for comparing said analogue voltage with said reference voltage so as to produce said control voltage when said analogue voltage exceeds said reference voltage; and ignition timing control means for controlling the ignition timing of said internal combustion engine in accordance with said control signal.

10. A knock level control apparatus for an internal combustion engine, which comprises:

converting means for converting sounds emitted from said internal combustion engine into electrical signals;

knocking voltage generating means for generating a knocking voltage representing a maximum voltage of frequency components of said electrical signal within a predetermined frequency band width;

knock level discriminating means for producing an advance or retard signal when said knocking voltage exceeds a function voltage according to the engine speed by times larger than a predetermined times, said knock level discriminating means including, an engine speed detector for producing an engine speed signal, a digital function generator for generating a pulse train of a repetition frequency according to said engine speed signal, an integrator for integrating said pulse train so as to produce a function voltage, a comparator for producing a higher level pulse when said knocking voltage exceeds said function voltage and a lower level pulse when said knocking voltage is lower than said function voltage, counting means for counting the number of the higher level and lower level pulses appearing during a unit time, storing and digital to analogue converting circuit for storing the digital information in said counting means and converting said digital information into a pair of analogue voltages, an analogue computer for producing a voltage representing a rate of one of said analogue voltages to the other of said analogue voltages, a reference voltage generator for producing a reference voltage, and a comparator for comparing said voltage from said analogue computer with said reference voltage so as to produce said control voltage when said voltage from said analogue computer exceeds said reference voltage; and ignition timing control means for controlling the ignition timing of said internal combustion engine in accordance with said control signal.

11. A knock level control apparatus for an internal combustion engine, which comprises:

converting means for converting sounds emitted from said internal combustion engine into electrical signals;

knocking voltage generating means for generating a knocking voltage representing a maximum voltage of frequency components of said electrical signal within a predetermined frequency band width;

knock level discriminating means for producing an advance or retard signal when said knocking voltage exceeds a function voltage according to the engine speed by times larger than a predetermined times, said knock level discriminating means including, an engine speed detector for producing an engine speed signal, a digital function generator for generating a pulse train of a repetition frequency according to said engine speed signal, an integrator for integrating said pulse train so as to produce a function voltage, a comparator for producing a higher level pulse when said knocking voltage exceeds said function voltage and a lower level pulse when said knocking voltage is lower than said function voltage, counting means for counting difference between the number of the higher level and lower level pulses appearing during a unit time, storing and digital to analogue converting circuit for storing the digital information in said counting means and converting said digital information into an analogue voltage, a reference voltage generator for producing a reference voltage, a comparator for comparing said analogue voltage with said reference voltage so as to produce said control voltage when said analogue voltage exceeds said reference voltage; and ignition timing control means for controlling the ignition timing of said internal combustion engine in accordance with said control signal.

* * * * *